Dec. 11, 1928.　　　　　　　　　　　　　　　　　　　1,694,995
J. R. THOMAS
SPRING CONSTRUCTION FOR FURNITURE
Filed April 14, 1927　　　3 Sheets-Sheet 1

Inventor
Joseph R. Thomas.

By William C. Linton.
Attorney

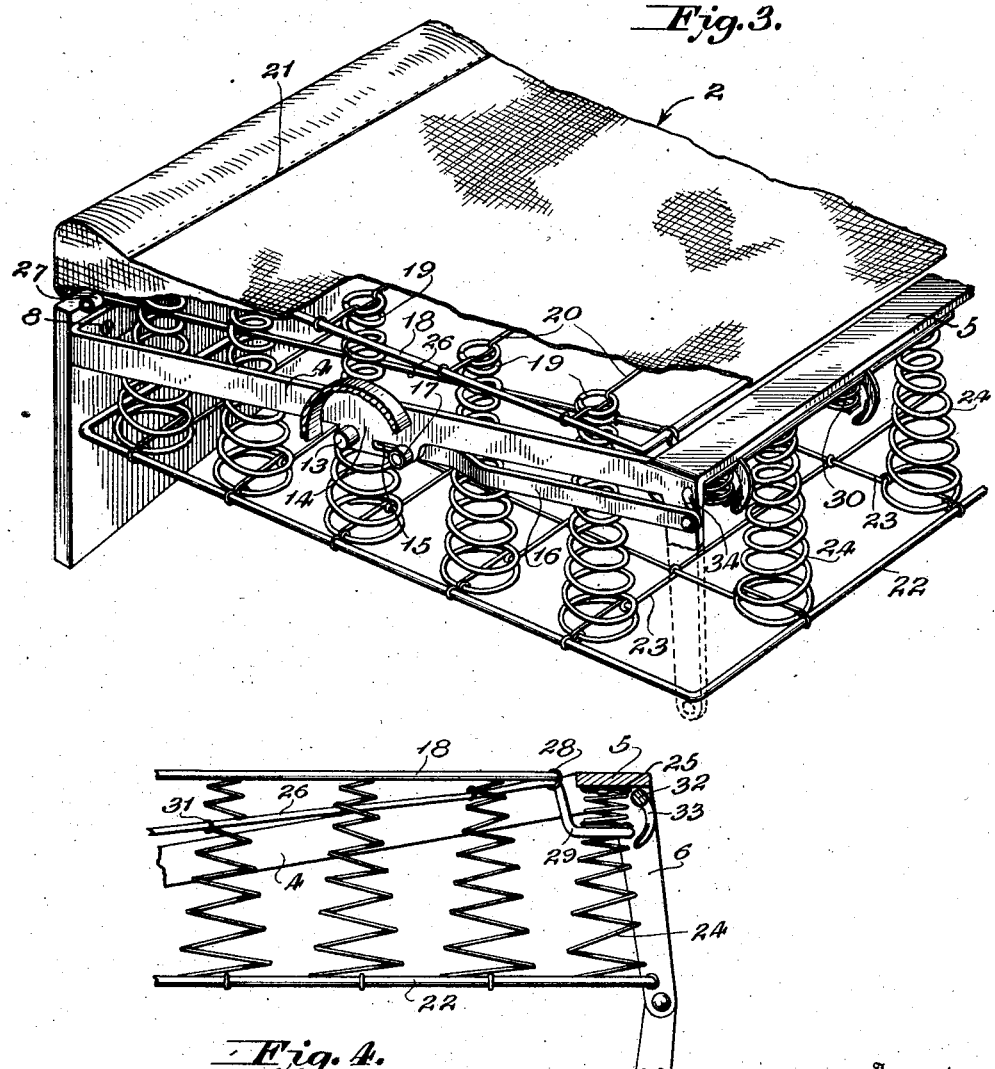

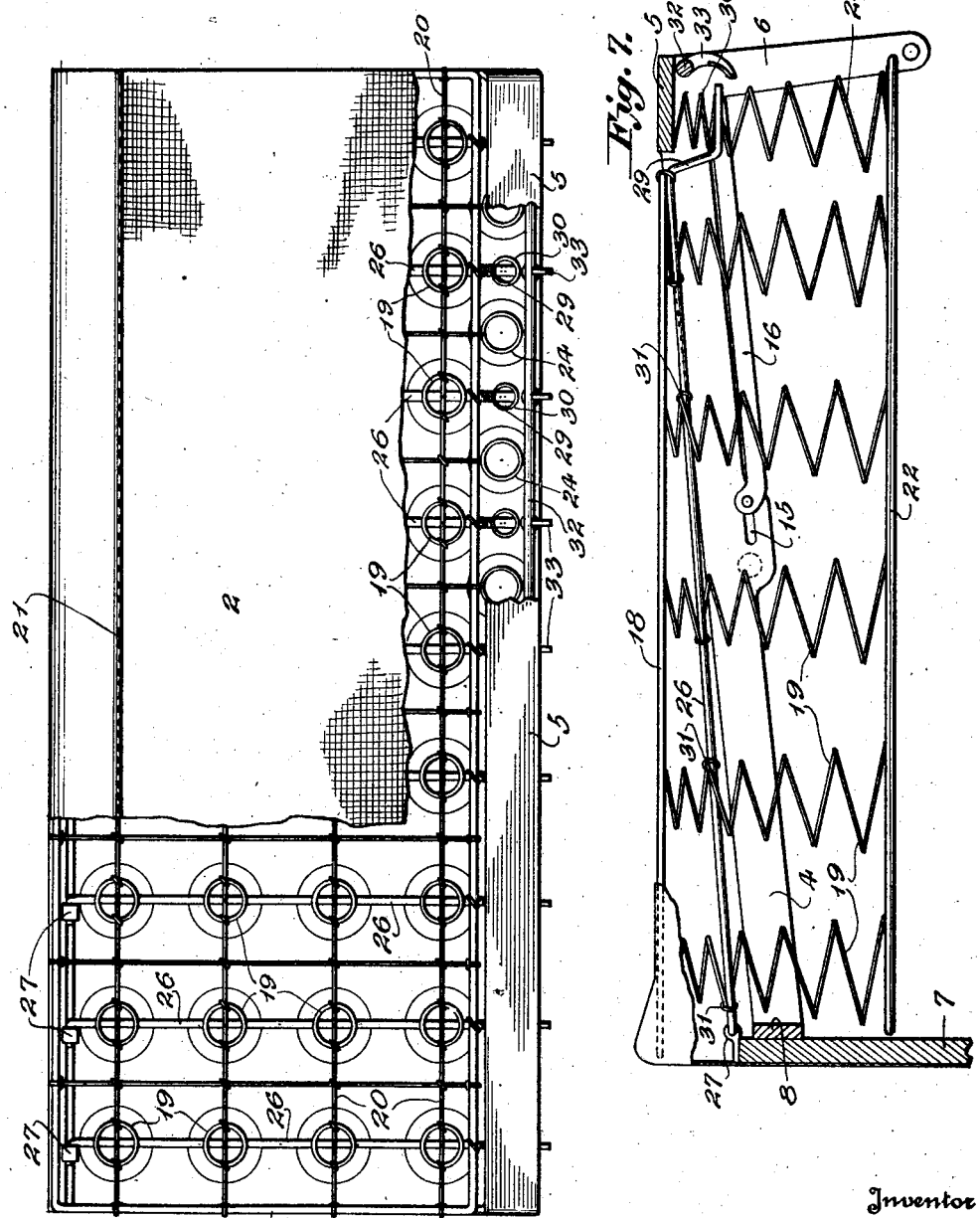

Patented Dec. 11, 1928.

1,694,995

UNITED STATES PATENT OFFICE.

JOSEPH R. THOMAS, OF FORT MADISON, IOWA.

SPRING CONSTRUCTION FOR FURNITURE.

Application filed April 14, 1927. Serial No. 183,796.

This invention relates to improvements in spring constructions for furniture, such for example as davenports, day beds (both double and single) sofas, chairs and the like, having for an object to provide an arrangement of springs which will afford a resiliency of maximum depth and wherein the advantages of a coiled spring support will be had, hence, lending materially to the comfort available through usage of furniture of this particular character.

It is also an object of the invention to provide a spring construction wherein the springs are so arranged and relatively connected that they will be caused to function in groups or sections and thereby will prevent malshaping of the cushion or pad or other device receiving the same, likewise, will prevent relative displacement of the springs, consequently, increasing the durability of the construction.

The invention also includes amongst its desiderata, the provision of a spring construction of the character mentioned wherein the main body and subsidiary sections are included, the subsidiary sections functioning to resiliently absorb stresses when the device is used as a seat, whereas both the main body and said subsidiary sections are utilized when the device is used as a bed, providing in this latter adaption, a maximum spring supporting area.

Other objects of the invention will be in part obvious and in part pointed out hereinafter.

In order that the invention and its mode of operation may be readily understood by those skilled in the art, I have in the accompanying illustrative drawings and in the detailed following description based thereupon, set out one possible embodiment of the invention.

Figure 1:
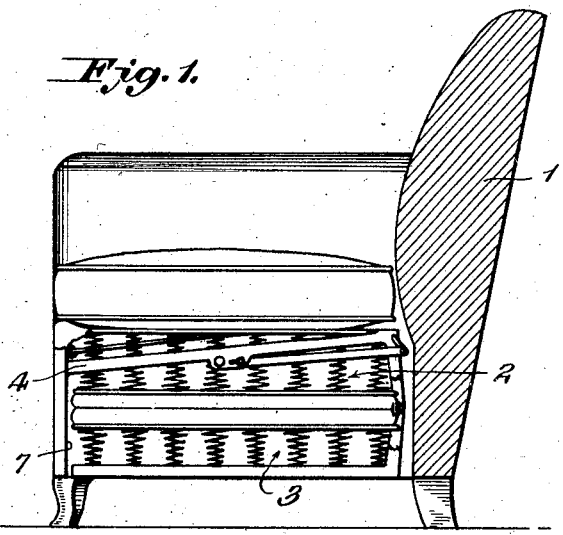
Figure 5:
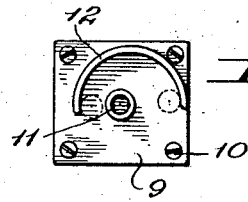
Figure 2:
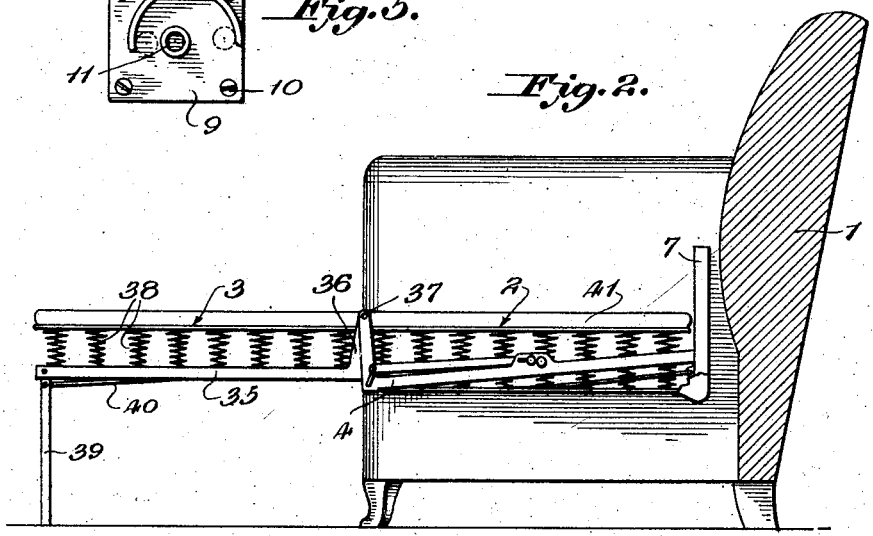
Figure 8:
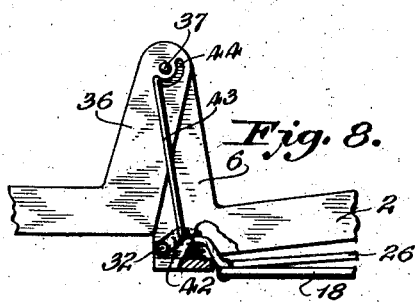

In these drawings:

Figure 1 is a vertical transverse section through a davenport wherein the improved spring construction is incorporated, Figure 2, is a similar view showing the davenport in open position or converted for usage as a bed, Figure 3 is an enlarged fragmentary detail in perspective, having parts thereof broken away to show the arrangement or disposition of the springs included by the main body and subsidiary sections, Figure 4 is an enlarged fragmentary detail in transverse section through a portion of the spring construction, particularly, the normally uppermost section, Figure 5 is a detail in elevation of the particular form of cam strip employed in connection with the swingable and normally upper spring construction, Figure 6 is a top plan view of the normally upper or outer spring construction, Figure 7 is an enlarged vertical transverse section through the same, and Figure 8 is a fragmentary detail, partly in elevation showing a slightly modified construction or arrangement of cam actuating means for use in connection with the normally upper spring construction.

Having more particular reference to the drawings, in connection with which like characters of reference will designate corresponding parts throughout, 1 generally indicates a davenport construction having the sides and the back thereof suitably upholstered or otherwise finished, as is common in the art, while spring carrying sections are designated in their entireties by the numerals 2 and 3.

The spring carrying section 2 consists of a body portion formed of scrap or similar metal, substantially rectangular in configuration and having obliquely disposed sides 4 and one end thereof widened and arranged in a plane at substantially right angles to that in which the remaining portions of such body portion are arranged, the widened and flattened end being designated by the numeral 5. Complemental right angularly disposed arms 6 are formed integral with the opposite extremities of the end 5 of the body portion, while to the opposite end of said body portion, a panel or end board 7 is secured through the medium of bolts or screws designated at 8; it being noted in this connection, that with arrangement of the body portion in its normal horizontal position, the flattened and widened end 5 thereof will be spaced vertically from that end of the same having the end board or panel 7 connected thereto.

Bearing bracket plates 9 are secured through screws or similar fastening devices 10 to the inner faces of the opposite sides of the davenport 1, these plates having suitable bearings 11 fixed thereupon and segmental bearing strips 12 also fixedly arranged thereupon, the latter being eccentric to the bearings 11. Pintles 13 fixedly mounted upon the widened and intermediate portions 14 of the opposite sides of the body portion are adapted to be rotatably engaged in the bearings 11 of the plates 9 and thus, it will be understood that said body portion is, in this manner, pivotally supported with respect to the davenport 1. Also, longitudinally disposed slots 15 are formed in the widened intermediate portion 14 of the opposite side of the body portion and slidably receive therethrough pins carried upon the adjacent ends of connecting arms 16, these latter, as will be noted upon reference to the Figures 1 and 3, being closed in substantially parallelism to adjacent portions of said opposite side of the body portion. Rollers 17 are mounted upon those portions of said pins extended beyond the outer faces of the widened intermediate portions 14 and such rollers are adapted to be engaged with and over the segmental bearing strips 12, whereby with pivotal movement of the body portion with respect to the opposite sides of the davenport 1, a longitudinal movement will be imparted to the connecting arms 16, the purpose of which will be subsequently described.

A frame of substantially rectangular configuration, designated by the numeral 18 is received within the normally upper portion of the body portion, it being noted in this connection that one end of the frame is adjacent to the inner marginal portion of the widened and flattened end 5 and is substantially flush therewith. A plurality of coiled springs generally indicated by the numeral 19 are connected through suitable tie rods 20 and at regularly spaced intervals throughout the frame 18, while suitable upholstery 21 is arranged over the normally outer side of the frame 18 for obvious purposes.

A second and larger rectangular frame 22 is provided this section 2 and as will be noted upon reference to the Figures 3 and 4, this frame is connected to the adjacent ends of the various coiled springs 19 through the medium of appropriately arranged tie rods 23 having connection at their opposite ends with adjacent portions of said frame 22.

Other coiled springs 24 are connected at their basal portions to the frame 22 through the medium of tie rods 23 and the opposite extremities of the springs are connected by suitable clamps or connecting means 25 to the adjacent side of the flattened and widened end 5 of the body portion; it being noted in this connection that the springs 24 are staggered in their transverse disposition with respect to the aforementioned springs 19.

A plurality of longitudinally disposed rods 26 are provided the section 2, the normally forward ends of said rods being pivoted as at 27 to the normally upper end of the panel 7, as is shown in the Figures 3 and 6, these rods 26 being disposed obliquely and in approximate parallelism to the obliquely disposed opposite sides 4 of the body portion, aforesaid; the free ends of said rods being connected through suitable devices 28 to adjacent ends of the spring engaging frame 18, whereupon they are provided with integral right angularly formed extensions or arms 29, the extremities of which are arranged in substantially parallelism to the normally under side of the flattened and widened end 5 and in perpendicularly spaced relation thereto, as is clearly shown in the Figure 4. Auxiliary springs 30 are arranged between the said parallel extremities of the angular extensions 29 and the adjacent portions of said end 5, thus serving as means for effecting a yieldable connection as between the rods 26 and said end 5 of the body portion of the section 2.

That collective movement and an even diffusion of stresses directed onto the upholstery 21 may be effected through the springs 19, those portions of each of the rods 26 adjacent the springs 19 are connected to the same through clips or similar means 31.

A shaft 32 is mounted in suitable bearings provided therefor in portions of the arms 6 and is arranged adjacent the normally under side of the flattened and widened end 5, said shaft carrying a plurality of relatively fixed curved fingers 33 adapted, at times, to be engaged with adjacent portions of the extensions 29; the opposite ends of said shaft 33 being formed with crank-like extensions 34 having pivotal connection with the adjacent ends of the connecting arms 16, hereinbefore described.

The section 3 may be stated to comprise a body portion 35 formed of scrap metal or other suitable material having arms 36 integral with certain of the ends thereof in order that a pivotal connection as at 37 may be effected between the two sections 2 and 3; coiled spring carrying frames being provided said body portion 35, between which a plurality of relatively spaced coiled springs 38 are connected.

Supporting legs 39 are pivotally connected to those ends of the body portion 5 opposite the arms 36 and these legs are adapted to be automatically moved from inoperative to operative positions, as is shown in the Figure 2, through the medium of connecting rods 40 and suitable motion transmitting means, not shown herein.

A foldable pad or mattress 41 is of course provided the sections 2 and 3 and with conversion of the davenport into a bed, is adapted to be arranged in the manner shown in the Figure 2.

In the Figure 8, I have shown a slightly modified form of means for transmitting rotary motion to the shaft 32, engaging crank like extensions 42 with the opposite extremities of said shaft, while the free ends of said crank like extensions are pivotally engaged by rods 43 arranged adjacent the normally outer sides of the arms 6 of the section 2. Segmental slots or ways 44 are formed in the free extremities of the arms 36 of the section 3, which as will be borne in mind, are pivotally connected to the arms 6 as at 37, and the adjacent ends of said rods 43 are formed with angular extensions slidably engaged in said slots or ways 44. Thus, with pivotal movement as between the arms 6 and 36, a rectilinear movement will be imparted to each of the rods 43 and consequently thereupon, the shaft 32 will be rotated or partially rotated.

In operation of my improved davenport construction when it is desired to convert the same into a bed, the superimposed sections 2 and 3, as is shown in the Figure 1 are rotated by reason of the rotatable engagement of the pintles 13 upon the opposite sides of the body portion of the section 2. The sections 2 and 3 are rotated until the panel or end board 7 assume that position as is shown in the Figure 2, whereupon the section 3 is swung outwardly from the section 2 by reason of the pivotal connection 37 between the arms 6 and 36, to that position as is also shown in the Figure 2, whereupon the supporting legs 39 of the section 3 will be automatically moved to their operative or supporting positions. With pivotal movement of the section 2, it will be understood that a rectilinear or longitudinal movement will be imparted to the connecting arms 16 or rods 43, thereby rocking the shaft 32 and causing inward swinging movement of the curved fingers 33 into engagement with the free ends of the right angularly formed extensions 29 upon the connecting rods 26. In this way, the auxiliary springs 30 will be compressed and consequently thereupon, the right angularly formed extensions 29 will be brought into fixed engagement with the flattened and widened end 5 of the body portion of said section 2; hence, preventing objectionable vibratory movement of said extensions and the clanging of the same upon said flattened and widened end 5 with the application of weight or stress to the springs 19.

With arrangement of the section 2 in the position as shown in the Figure 2, it will be understood that a resilient supporting medium will be provided for the mattress or pad 41 engaged thereover, in that the spring engaging frame 22 will transmit and evenly diffuse such stresses as might be applied thereto throughout the springs 19 and 24; it being noted that the springs 24 have certain of their ends connected to said frame 22 and their opposite ends connected to the flattened and widened end 5 of the body portion. Also, as hereinbefore stated, because of the fact that the opposite ends of the springs 19 are engaged with the tie rods 20 of the spring frame 18 and the latter is fixedly connected to the flattened and widened end 5 of the body portion 2 of said section when the bed is opened, an effectual supporting means will be afforded said springs 19, whereby to permit the same to effectually function.

When the davenport is used as a seat, that is, it is arranged in that form as is shown in the Figure 1, it will be understood that the panel 7 will serve as a closure for the now outer ends of the sections 2 and 3 whereas the obliquely arranged and diagonally disposed connecting rods 26 will serve as a means for evenly distributing stresses applied to the seat throughout the spring construction. Furthermore, it will be understood and appreciated that because of the connections as between the intermediate portions of the connecting rods 26 and the adjacent springs 19, those portions of such springs above their respective tie rods 26 will function to resiliently absorb minor or lesser stresses imparted thereto, while with transmission of major stresses to the seat, said connecting rods 26 will be permitted of pivotal movement at their respective pivotal mountings 27 and hence, will function to evenly diffuse and absorb such major stresses throughout the spring construction of the section 2 and likewise of the section 3 arranged immediately therebelow. Furthermore, it will be understood that because of the interpositioning of the auxiliary springs 30 between the right angularly formed extensions 29 of the rods 26 and the flattened and widened end 5 of the body portion of said section 2, said extensions 29 will be prevented from contacting with the end 5 and producing annoying noise.

Manifestly, the construction shown is capable of considerable modification and such modification as is within the scope of my claims, I consider within the spirit of my invention.

I claim:

1. In a davenport, a plurality of pivotally connected spring carrying sections, adapted to be arranged in superposed relation, at times, one of said sections comprising a substantially rectangular body portion, bearing means on the intermediate portions of the sides thereof for pivotally supporting the same upon the davenport, a panel fixed to one end of the body portion, a coiled spring engaging frame received within the body portion arranged flush with the free end thereof, another frame connected to the opposite ends of the coiled springs, certain of the coiled springs being connected to the free end of said body portion, a plurality of longitudinal rods pivoted to the panel and connected to portions of certain of the coiled springs, each of said rods having angular extensions on their free ends disposed in proximity to the free end of the body portion, auxiliary springs arranged between said extensions and said free end, and means engageable with said auxiliary springs for automatically compressing the same, upon pivotal movement of said sections.

2. In a davenport, a plurality of pivotally connected spring carrying sections, adapted to be arranged in superposed relation, at times, one of said sections comprising a substantially rectangular body portion having obliquely disposed opposite sides and one end thereof being flattened and widened, bearing means on the intermediate portions of the sides of said body portion for pivotally supporting the same upon the davenport, a panel fixed to that end of the body portion opposite said flattened and widened end, a coiled spring engaging frame received within the body portion arranged flush with the flattened and widened end thereof, another frame connected to the opposite ends of the coiled springs, certain of the coiled springs being connected to said flattened and widened end of the body portion and arranged in staggered relation with respect to the remaining springs, a plurality of longitudinal rods pivoted to the panel and connected to portions of certain of the coiled springs, each of said rods having angular extensions on their free ends disposed in proximity to the flattened and widened end of the body portion, auxiliary springs arranged between said extensions and flattened and widened end, and means engageable with said auxiliary springs for automatically compressing the same upon pivotal movement of said body portions 3. In a davenport, a plurality of pivotally connected spring carrying sections, adapted to be arranged in superposed relation, at times, one of said sections comprising a substantially rectangular body portion having obliquely disposed opposite sides and a widened and flattened end, bearing means on the intermediate portions of the obliquely disposed sides for pivotally supporting the body portion upon the davenport, a panel fixed to one end of the body portion, a coiled spring engaging frame received within the body portion and arranged flush with the flattened and widened end, another frame connected to the opposite ends of the coiled springs, certain of the coiled springs being connected to said flattened and widened end of the body portion and arranged in transversely staggered relation with respect to the remaining springs, a plurality of longitudinal rods pivoted to said panel and extended into proximity to the opposite end of said body portion, the intermediate portions of said rods being connected to portions of certain of the coiled springs, each of said rods having right angularly formed extensions on those ends in proximity to the flattened and widened end of the body portion, auxiliary springs interposed between said right angular extensions and said flattened and widened end of the body portion, the intermediate portions of the opposite sides of the body portion having slots formed therein, connecting arms having slidable engagement with said slots, a shaft mounted adjacent to and disposed longitudinally of said flattened and widened end of the body portion having crank like extensions on its opposite ends, the free ends of said connecting arms being engaged with said crank like extensions, and means upon the davenport engageable with said connecting arms for transmitting rectilinear motion thereto with pivotal movement of the body portion whereby said shaft will be oscillated and said rods moved upon their pivotal connections for compressing said auxiliary springs substantially as and for the purpose specified.

4. In a davenport, a plurality of pivotally connected spring carrying sections adapted to be arranged in superposed relation, at times, one of said sections comprising a substantially rectangular body portion, bearing means on the intermediate portions of the sides thereof for pivotally supporting the same upon the davenport, a panel fixed to one end of the body portion, a coiled spring engaging frame received within the body portion having one end inwardly of and adjacent the free end of said body portion, another frame connected to the opposite ends of the coiled springs, certain of the coiled springs being connected to the free end of said body portion and arranged in relatively transverse staggered relation with respect to the remaining springs, a plurality of longitudinal rods pivoted to the panel and connected to portions of certain of the coiled springs, each of said rods having angular extensions on their free ends disposed in proximity to the free end of the body portion, auxiliary springs arranged between said extensions and said free ends, and means for fixedly connecting said first frame to the free end of said body portion at times, said means being operable automatically with pivotal movement of the sections.

In witness whereof I have hereunto set my hand.

JOSEPH R. THOMAS.